Sept. 26, 1944.   G. M. MAGRUM   2,358,988
HYDRAULIC SHOCK ABSORBER VALVING ASSEMBLY
Filed Oct. 9, 1942   2 Sheets-Sheet 2
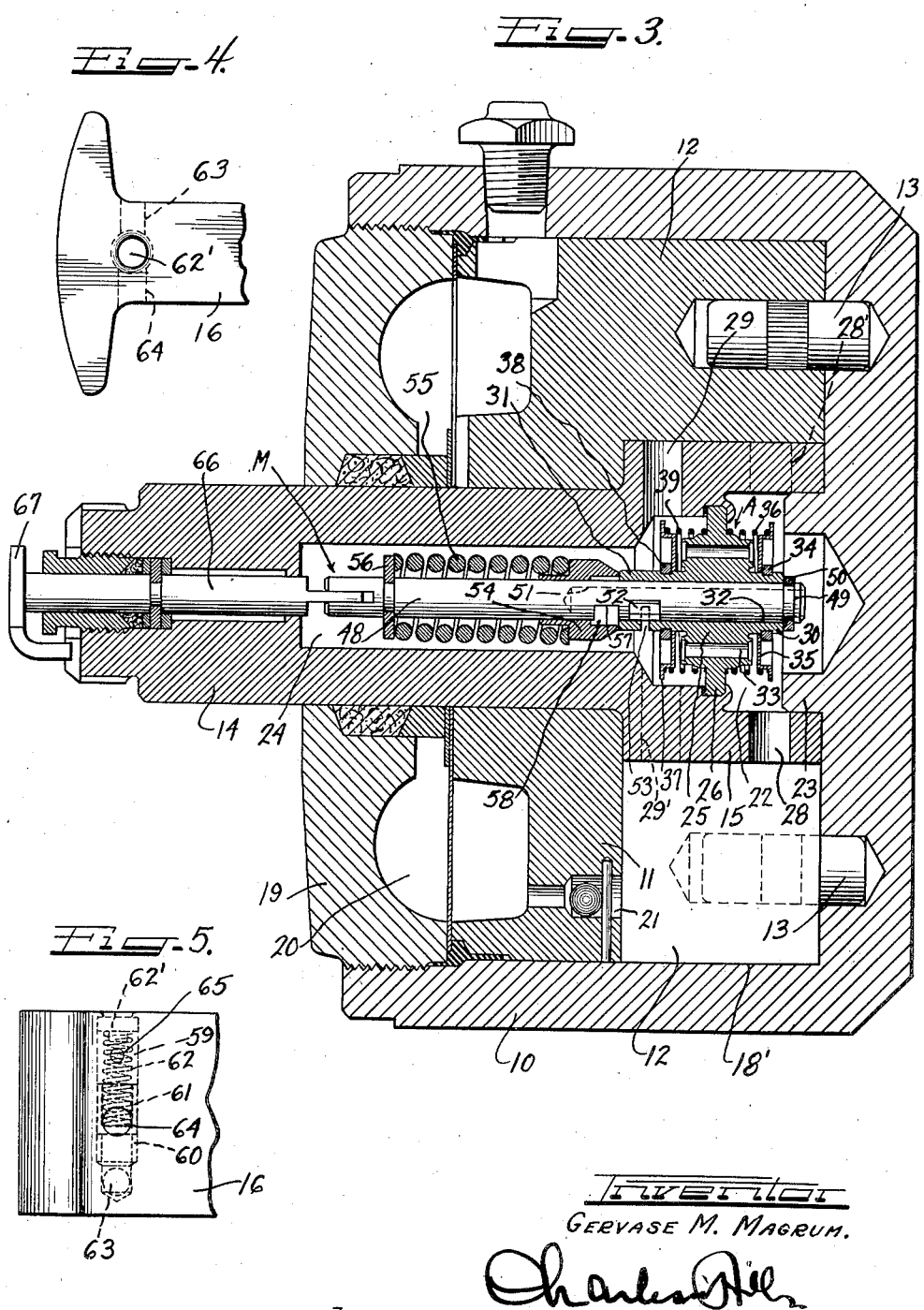
Inventor
GERVASE M. MAGRUM.

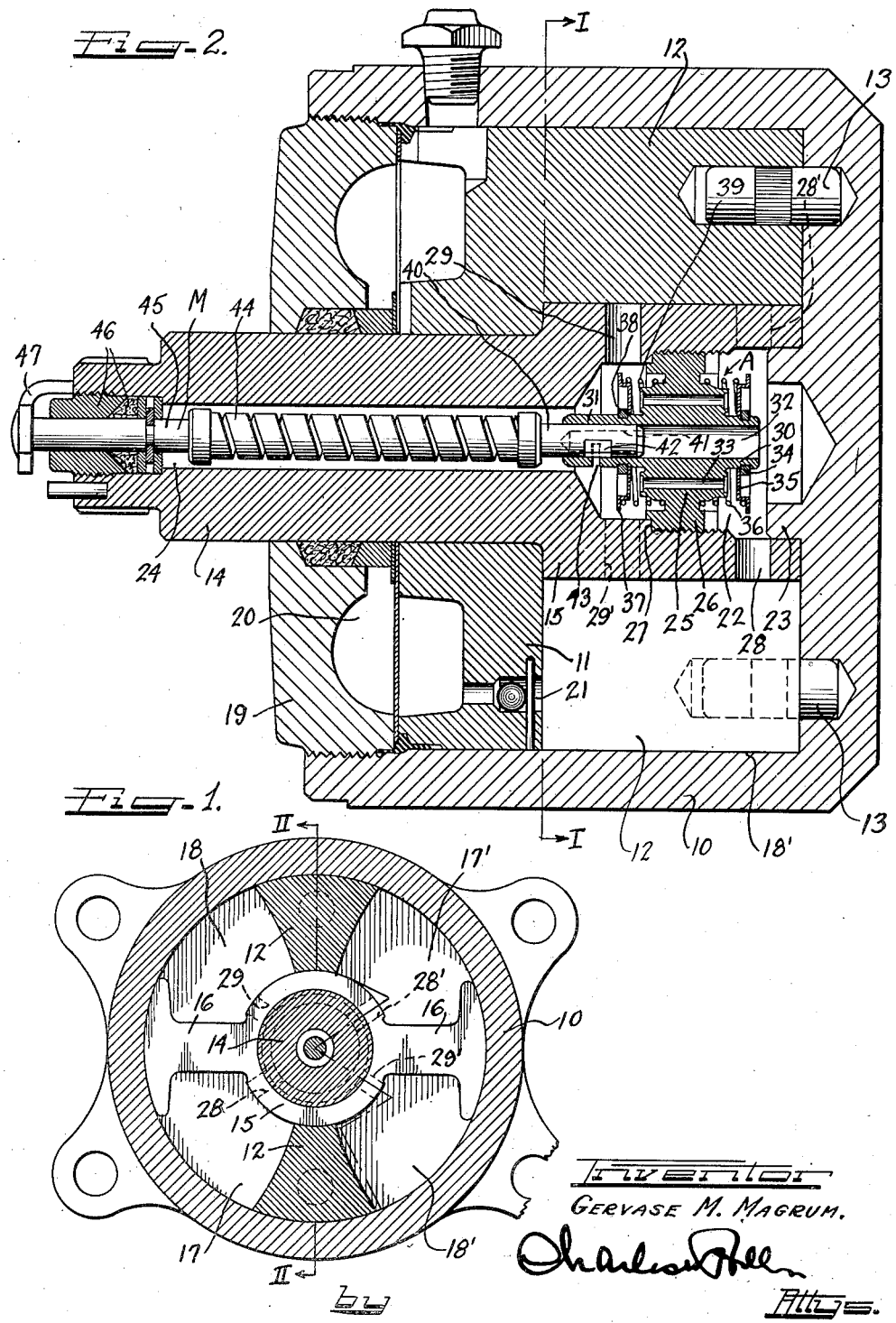

Patented Sept. 26, 1944

2,358,988

UNITED STATES PATENT OFFICE 2,358,988

HYDRAULIC SHOCK ABSORBER VALVING ASSEMBLY

Gervase M. Magrum, Buffalo, N. Y., assignor to Houdaille-Hershey Corporation, Detroit, Mich., a corporation of Michigan Application October 9, 1942, Serial No. 461,365

1 Claim. (Cl. 277—54)

My invention relates to hydraulic shock dampers or absorbers, and particularly to improved valving assembly for controlling the flow of displaced hydraulic fluid.

An important object of the invention is to provide a valving assembly comprising a main valve adjustable to interpose a predetermined resistance of the fluid flow between hydraulic working chambers in the shock absorber, and auxiliary valving means functioning, during slow or gradual relative movement of the cylinder and piston to by-pass displaced fluid around the main valve but which, upon more sudden or increasing pressure flow, closes so that the displaced flow must be through the main valve. For example, where the shock absorber is used for controlling the operation of a castoring wheel on an airplane landing gear, the auxiliary valve means will permit comparatively free flow of the displaced hydraulic fluid during slow or gradual movement of the castoring wheel, but will shut off the free flow during more abrupt movements of the castoring wheel so that the movements of the castoring wheel will then be controlled by the resistance to the flow of the fluid through the main valve.

The main features of my invention are embodied in the structure disclosed on the drawings, in which Figure 1 is a section on the line I—I of Figure 2 of a shock absorber in which my improved valving assembly is applied;

Figure 2 is a section on plane II—II of Figure 1;

Figure 3 is a section similar to Figure 2 showing a modified valving arrangement;

Figure 4 is an elevation view of the outer end of one of the piston vanes to show relief passageway and valving means; and Figure 5 is a side elevation of the structure on Figure 4.

Except for modified arrangement of the valving assembly, the structure and the shock absorber on Figures 2 and 3 is the same. It comprises the cup-shaped housing 10 receiving at its outer end the bearing wall 11, from which abutment walls 12 extend to the base of the housing, pins 13 holding the wall and abutments against rotational displacement within the housing. The bearing wall journals the piston shaft 14 extending from the cylindrical piston hub 15 within the abutments 12, the hub having vanes 16 which, with the abutment, define hydraulic working chambers 17, 17' and 18, 18'.

A closure member or cover 19 is screwed into the outer end of the housing 10 to axially hold the wall 11 and abutments 12 in place, the wall 11 and cover 19 having opposed recesses forming a reservoir 20 for hydraulic fluid which is fed to the working chambers through check valve controlled passageways 21, in a manner well known in the art. When the shock absorber is employed on a vehicle, such as an automobile, the housing is usually secured to the vehicle body and the outer end of the piston shaft is connected by suitable levers with the vehicle axle so that upon relative movement between the axle and body the piston structure will be operated in the housing to displace fluid in the working chambers. When the shock absorber is employed on aircraft landing gear, the shock absorber housing may be mounted on the landing gear framework and the piston shaft connected by suitable levers with the castor wheel assembly so that castoring movement of the wheel will cause oscillation of the piston structure within the housing.

At its inner end the piston hub has the wall or chamber 22 into which extends a boss 23 on the housing base for affording additional bearing support for the piston structure. Extending outwardly through the piston shaft from the chamber 22 is the bore 24 through which extends the main valve structure M. Within the chamber 22 is the valve seat body 25 of the auxiliary valve structure A, the seat body being secured at substantially the middle of the chamber 23 by threaded engagement of its flange portion 26 with the piston hub to seat against a shoulder 27.

The outer end of the chamber 22 is connected by passageways 28 and 28' with the hydraulic working chambers 17 and 17' respectively, while the inner end of the chamber 22 is connected by passageways 29 and 29' with the working chambers 18 and 18', respectively, the seat member 25 being interposed between these two sets of passageways.

The valve seat member 25 has inwardly and outwardly extending necks 30 and 31 thereon, coaxial therewith, and through the seat member and the necks extends the bore 32. Extending through the valve seat body 25 are a number of ports 33 communicating at their end with the inner and outer ends of the chamber 22. Shiftable axially on the neck 30 between the inner end of the body 25 and a washer 34 on the neck is the annular valve 35 between which and the seat is interposed a spring 36 tending to hold the valve outwardly against the washer 34 for exposure of the inner ends of the passageways 33. A similar valve 37 is mounted on the neck 31 between the outer end of the seat and the washer 38 on the neck, a spring 39 tending to hold the valve against the washer to expose the outer ends of the passageways 33.

With the structure thus far described, the springs 36 and 39 will tend to hold the respective valve open for exposure of the passageways for flow therethrough. During comparatively slow movement of the piston and comparatively low pressure impulses of the fluid flow, the passageway 33 will remain open for comparatively free flow of the displaced fluid from one set of the working chambers to the other. However, under more rapid or increased pressure flow the corresponding valve will be moved against the resistance of its spring toward its closing position to shut off flow through the passageway 33 so that the shock absorber then becomes effective to resist further flow.

In the arrangement shown in Figure 2, a valve plug 40, forming part of the main valve structure M, seats in the outer end of the bore 32 to control the resistance to the displaced fluid flow when the passageways 33 are closed against free flow. The valve plug has the bore 41 communicating with the bore 32 and a cross slot 42 in the valve registers with an orifice slot 43 through the neck 31. By rotational adjustment of the valve plug the degree of exposure to flow of the orifice slot is determined for the desired resistance to flow of the displaced fluid after closure of the passageways 33. The valve plug may be adjusted both manually and thermostatically. As shown on Figure 2 a helical thermostat element 44 is located within the shaft bore 24 and has one end secured to the valve plug and its other end secured to a stem 45 extending upwardly through a packing and gland assembly 46 and terminating at its outer end in an adjusting lever 47. By turning of the lever 47 the valve plug may be set for the desired exposure to flow of the orifice slot 43, and then during operation of the shock absorber and change in temperature of the hydraulic fluid the thermostat 44 will thermostatically effect setting of the valve plug to compensate for the variation in the viscosity of the hydraulic fluid so that the damping or shock absorbing characteristics of the shock absorber may be maintained independently of temperature variations. Upon closure of the passageways 33 by either of the valves 35 and 37, all of the displaced fluid flow must be through the orifice slot 43 against the flow resistance determined by the area of the orifice.

When a shock absorber such as that shown on Figure 2 is used for controlling the castoring wheel on an airplane landing gear, then, under normal or comparatively slow castoring movement of the wheel, the springs will hold the auxiliary valves open for comparatively free flow of the displaced hydraulic fluid, but under sudden or abnormal movements of the wheel and corresponding pressure beyond a predetermined amount, the valves will be closed so that the displaced fluid flow will then have to be through the orifice 43 for dampening of further castoring movement of the wheel.

The shock absorber shown in Figure 3 is adapted particularly for use on a vehicle such as an automobile. A comparatively long valve plug 48 extends entirely through the bore 32 of the valve seat member 25, the inner end of the plug having the annular groove 49 receiving an abutment collar 50 for abutting the inner end of the neck 30 on the seat member. The valve bore 51 extends through the inner end portion of the plug and has the slot 52 overlapping the orifice slot 53 in the neck 31 on the seat member for determining the orifice passageways for resisting the flow of displaced hydraulic fluid when the passageways 33 are closed.

Where the shock absorber is used in an automotive vehicle, the body 10 will be secured to the chassis and the shaft to the axle, in a manner well understood in the art. During the compression or bound stroke of the shock absorber, that is during compression of the vehicle springs, the fluid flow will be from the working chamber 18, 18' through the passageways 29 and 29', through the orifice 53 and the valve bore 51, and through the passageways 28 and 28' into the working chambers 17, 17'. During rebound of the vehicle springs, the flow will be in the opposite direction through the path just traced. In order to prevent straining or distortion of the shock absorber under abnormal pressure during rebound flow, a blow off valve 54 is provided. In the arrangement shown this valve receives and is slidable on the valve plug 48, and a spring 55 interposed between the valve and a collar 56 on the outer end of the valve plug tending to hold the valve seated against the outer end of the neck 31 on the valve seat member 25. The valve plug has the slot 57 connecting the bore 51 with the annular space 58 between the valve plug and the valve 54 so that abnormal rebound pressure flow exerted against the blow off valve will cause unseating thereof for relief of the pressure until it again assumes a safe limit. Under normal rebound pressure conditions the valve 54 will remain closed.

It may also be desirable to provide for relief of abnormal pressure during the compression or bound stroke of the shock absorber. A relief passageway may be provided in one of the piston vanes, as shown in Figures 4 and 5. The vane is bored to provide a valve chamber 59 having in one end thereof the annular seat 60 for the valve 61 in the form of a piston, a spring 62 anchored by a plug 62' in the valve chamber end tending to hold the valve against the seat 60. Below the seat a passageway 63 leads from the valve chamber to the working chamber in advance of the vane, the valve chamber above the seat 60 being connected by passageway 64 with the working chamber behind the vane. Under ordinary pressures during the bound stroke, the spring 62 will hold the valve 61 closed, but under abnormal bound pressure flow the valve 61 will be open to expose the outlet 64 for relief flow of the fluid until normal pressure conditions are again re-established.

A vent 65 is provided for the valve chamber 59 and opens to the same side of the vane as the passageway 64.

For adjusting the valve plug 48, a stem 66 is coupled to the valve plug and extends to the exterior of the shaft 14 and carries the adjusting lever 67. By providing different strength springs for the valve 35 and 37 of the auxiliary valve structure A, or by setting the valves normally at a greater or less distance away from the ends of the passageways 33, the free flow periods through the passageways may be controlled as desired.

I have shown practical and efficient embodiments of the features of my invention but I do not desire to be limited to the exact construction, arrangement and operation as shown and described as changes and modifications may be made without departing from the scope of the invention.

I claim as follows:

A valving assembly for controlling the displaced fluid in a hydraulic damper, comprising a seat member interposed in the path of the fluid flow and having an annular body portion, a substantially central boss extending from each of opposite faces thereof, a central fluid passage extending through said bosses and connecting opposite ends thereof, other fluid passages radially spaced from said bosses and extending through said body portion and forming ports on opposite faces thereof, an annular valve member supported on each of said bosses and movable into closing relation with said ports, a spring between each valve member and the adjacent face of said body portion, each boss having means thereon outwardly of and engageable by the valve member to limit outward movement thereof, and a central valve member cooperating with said central fluid passage and adjustable to control the flow of fluid through said central fluid passage.

GERVASE M. MAGRUM.